US012416890B2

(12) United States Patent
Akama

(10) Patent No.: US 12,416,890 B2
(45) Date of Patent: Sep. 16, 2025

(54) IMAGE FORMING APPARATUS INCLUDING A HOUSING AND DRIVE UNIT AND A DRIVER DISPOSED OUTSIDE THE HOUSING

(71) Applicant: Shiro Akama, Tokyo (JP)

(72) Inventor: Shiro Akama, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 30 days.

(21) Appl. No.: 18/521,185

(22) Filed: Nov. 28, 2023

(65) Prior Publication Data

US 2024/0176277 A1 May 30, 2024

(30) Foreign Application Priority Data

Nov. 29, 2022 (JP) ................................ 2022-190318

(51) Int. Cl.

*G03G 15/00* (2006.01)
*G03G 21/16* (2006.01)
*G03G 21/20* (2006.01)

(52) U.S. Cl.

CPC ....... *G03G 15/757* (2013.01); *G03G 21/1647* (2013.01); *G03G 21/206* (2013.01)

(58) Field of Classification Search

USPC .......................................................... 399/167
See application file for complete search history.

(56) References Cited

U.S. PATENT DOCUMENTS

2009/0169246 A1* 7/2009 Ooyoshi ............ G03G 21/1821 399/111
2013/0064567 A1 3/2013 Akama et al.
2014/0248066 A1 9/2014 Akiyama et al.
2016/0161903 A1 6/2016 Akama et al.
2016/0187825 A1 6/2016 Ueda et al.
2019/0286047 A1 9/2019 Ishimitsu et al.
2021/0103247 A1 4/2021 Akama et al.
2023/0109034 A1 4/2023 Akama

FOREIGN PATENT DOCUMENTS

JP 2003177583 A * 6/2003
JP 2005-049592 A 2/2005
JP 2012-048269 A 3/2012
JP 2019-015880 A 1/2019

OTHER PUBLICATIONS

Computer translation of cited reference to Hideyuki, JP2012-048269A, filed Mar. 8, 2012. (Year: 2012).*

* cited by examiner

*Primary Examiner* — Quana Grainger
(74) *Attorney, Agent, or Firm* — XSENSUS LLP

(57) ABSTRACT

An image forming apparatus includes a housing, a driven unit, and a driver. The housing includes a pair of plates facing each other. The pair of plates includes a front plate and a rear plate facing the front plate and having an opening. The driven unit is supported by the pair of plates and has one end projecting outside the housing from the opening of the rear plate. The driver is disposed outside the housing and coupled to said one end of the driven unit to drive the driven unit. The driver includes a body separated from an outer face of the rear plate.

13 Claims, 17 Drawing Sheets

(COMPARATIVE EXAMPLE)

FIG. 1B (COMPARATIVE EXAMPLE)

FIG. 1C (COMPARATIVE EXAMPLE)
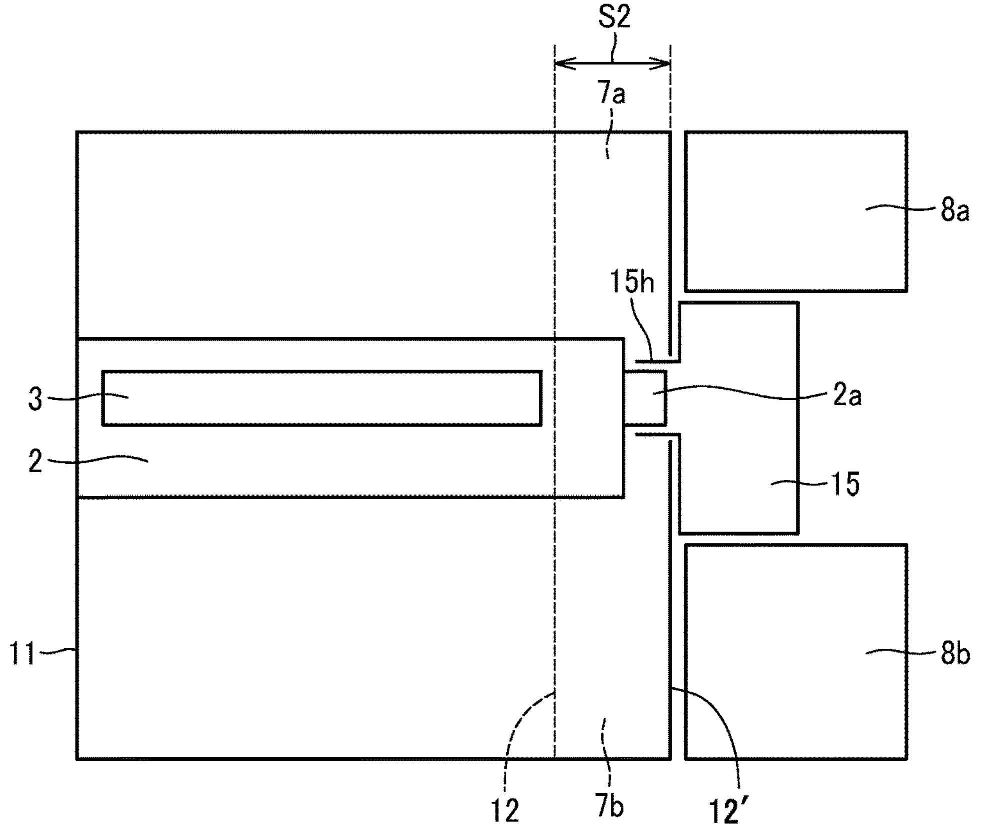
FIG. 1D
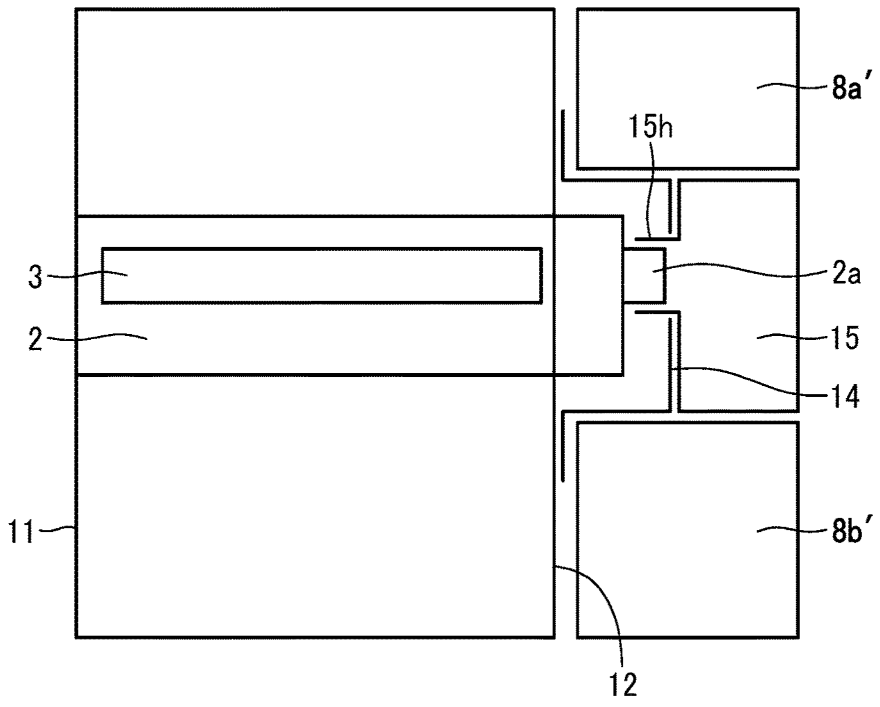

IMAGE FORMING APPARATUS INCLUDING A HOUSING AND DRIVE UNIT AND A DRIVER DISPOSED OUTSIDE THE HOUSING

CROSS-REFERENCE TO RELATED APPLICATION

This patent application is based on and claims priority pursuant to 35 U.S.C. § 119(a) to Japanese Patent Application No. 2022-190318, filed on Nov. 29, 2022, in the Japan Patent Office, the entire disclosure of which is hereby incorporated by reference herein.

BACKGROUND

Technical Field

Embodiments of the present disclosure relate to an image forming apparatus.

Related Art

One type of electrophotographic image forming apparatus such as a laser printer or a digital copier includes a photoconductor and a process unit including the photoconductor and units arranged around the photoconductor to perform image forming operations of an electrophotographic process, such as a developing unit and a cleaning unit. The process unit is detachably attached to a main body of the image forming apparatus.

The image forming apparatus includes a driver including a motor and a driving gear in the main body. The process unit includes a driven gear. When the process unit is installed in the main body of the image forming apparatus, the driven gear and the driving gear are connected to each other, and the driving force of the motor can be transmitted to the process unit, whereby the process unit is driven.

SUMMARY

This specification describes an improved image forming apparatus that includes a housing, a driven unit, and a driver. The housing includes a pair of plates facing each other. The pair of plates includes a front plate and a rear plate facing the front plate and having an opening. The driven unit is supported by the pair of plates and has one end projecting outside the housing from the opening of the rear plate. The driver is disposed outside the housing and coupled to said one end of the driven unit to drive the driven unit. The driver includes a body separated from an outer face of the rear plate.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 1B is a schematic cross-sectional side view of the image forming apparatus according to a comparative example viewed in a direction indicated by an arrow 1B in FIG. 1A;

FIG. 1C is a schematic cross-sectional side view of the image forming apparatus of FIG. 1B and component arrangement spaces above and below a driver;

FIG. 1D is a schematic cross-sectional side view of the image forming apparatus having component arrangement spaces enlarged by moving a rear plate from the position illustrated in FIG. 1C toward the front side;

Figure 1A:
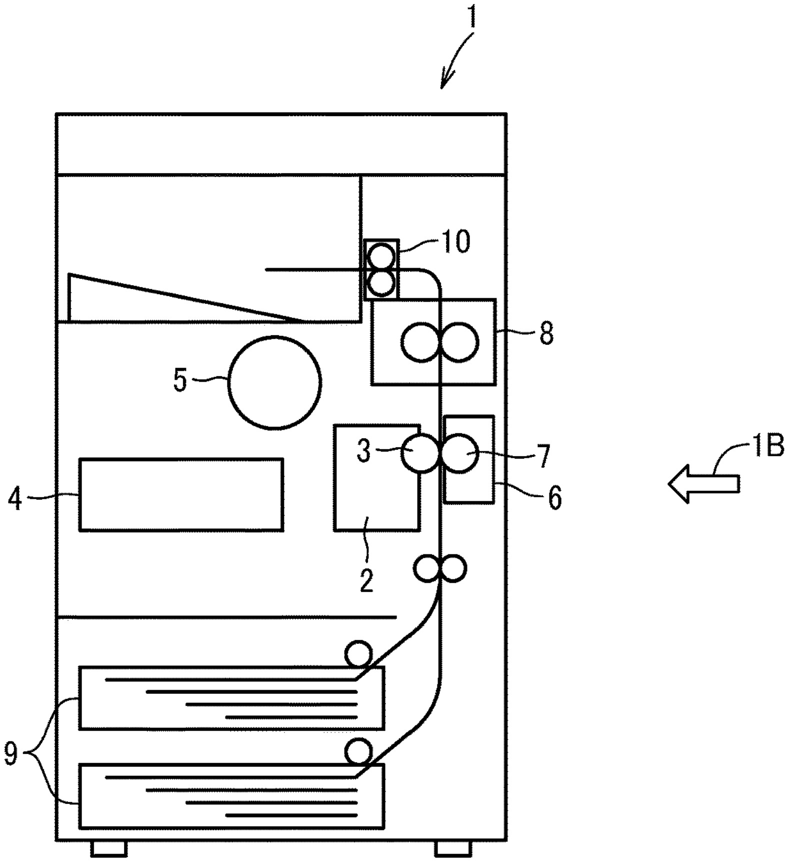
FIG. 1A is a schematic diagram illustrating a configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

With reference to FIG. 1A, an image forming apparatus 1 according to an embodiment of the present disclosure is described below. FIG. 1A is a schematic diagram illustrating a configuration of the image forming apparatus 1. The image forming apparatus 1 includes a process unit 2 including a photoconductor 3. The process unit is one example of a driven unit. In the following description, the image forming apparatus 1 is described as a monochrome image forming apparatus, but the image forming apparatus according to the present disclosure may be a color image forming apparatus.

The image forming apparatus 1 includes the process unit 2 to form an image with black toner. The process unit 2 includes a photoconductor 3, a charger, a developing device, and a cleaner and is detachably attached to the main body of the image forming apparatus 1. The photoconductor 3 has a drum-shape.

The image forming apparatus 1 includes a writing device 4. The writing device 4 irradiates the photoconductor 3 with laser light to form an electrostatic latent image on an image forming region of the surface of the photoconductor 3. Additionally, the image forming apparatus 1 includes a toner bottle 5 containing a developing toner above the writing device 4.

The image forming apparatus 1 includes a transfer device 6 including a transfer roller 7. The transfer roller 7 contacts the photoconductor 3 to form a transfer nip. A transfer bias is applied to the transfer roller 7 to form a transfer electric field in the transfer nip.

The image forming apparatus 1 includes a fixing device 8 above the transfer device 6 in FIG. 1A. The fixing device 8 fixes a toner image transferred to a recording medium such as a sheet onto the recording medium. The fixing device 8 includes a heat roller having a heat generator inside the heat roller. The heat roller serves as a fixing roller. The fixing device also includes a pressure roller facing the fixing roller. Between the transfer device 6 and the fixing device 8, the recording medium on which the toner image is transferred is conveyed toward the fixing device 8 along a conveyance direction of the recording medium.

The image forming apparatus 1 includes a sheet feeding device 9 in a lower part of the image forming apparatus 1 to feed the recording medium to the transfer device 6. The image forming apparatus 1 further includes a sheet ejection device 10 disposed on the left of the fixing device 8 in FIG. 1A. The sheet ejection device 10 ejects the recording medium, which has passed through the fixing device 8, to the outside of the image forming apparatus 1.

Figure 1A:
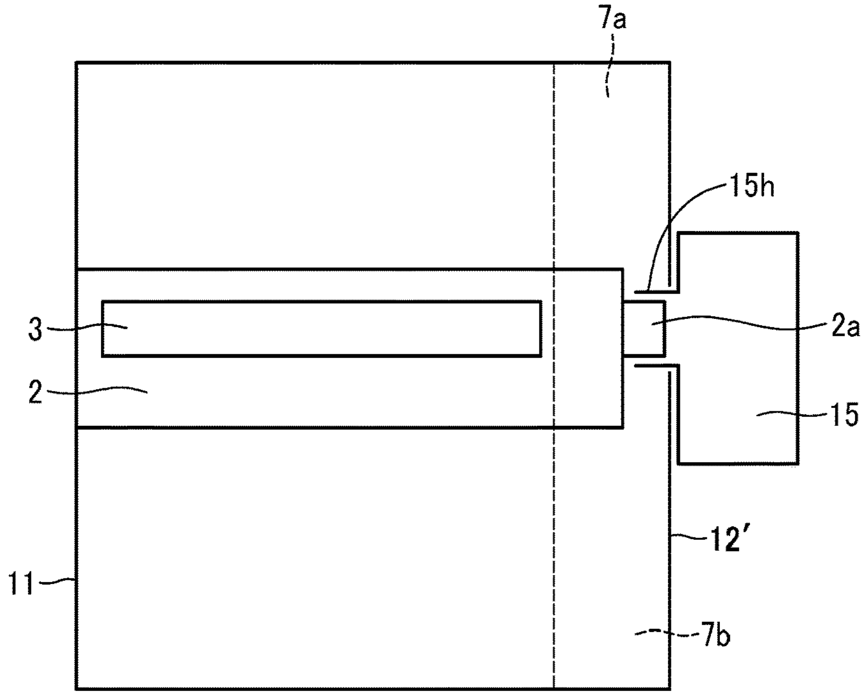

The image forming apparatus 1 includes a housing. The structure of the housing is described below. FIG. 1D is a schematic cross-sectional side view of the image forming apparatus viewed in a direction indicated by an arrow 1B in FIG. 1. As illustrated in FIG. 1D, the housing includes a pair of plates (that is, a front plate 11 and a rear plate 12). A bracket 14 as a positioner is attached to the rear plate 12 as described below. On an outer face of the bracket 14, a driver 15 is positioned and fixed. The driver 15 includes a motor and a drive gear to transmit a driving force of the motor to the process unit 2. Alternatively, a driver may include a body including the motor and the drive gear and multiple leg portions integrally formed with the body and directly fixed and positioned to the rear plate 12. In this case, the body of the driver is the driver 15 illustrated in the drawings.

FIGS. 1B and 1C are schematic cross-sectional side views of an image forming apparatus according to a comparative example viewed in the direction indicated by the arrow 1B in FIG. 1A. The driver 15 is positioned and fixed on an outer face of a rear plate 12' of a housing of the image forming apparatus according to the comparative example. The position of the rear plate 12 in the present embodiment is shifted from the position of the rear plate 12' of the comparative example illustrated in FIG. 1C toward the inside of the housing by a length S2. The range having the length S2 is outside the photoconductor 3 as an image bearer. The range is also a non-sheet passing region (in other words, a non-image forming region), which does not affect image formation. The range having the length S2 may be outside the image forming region in which the image is formed on the photoconductor as the image bearer in an axial direction of the photoconductor.

Moving the rear plate 12 inward by the length S2 can reduce the size of the housing of the image forming apparatus in the front-back direction by the length S2. Moving the rear plate 12 inward causes a long portion of one end of the process unit 2 to project from the outer face of the rear plate 12 (in other words, the right side of the rear plate 12 in FIG. 1D) toward the outside. As a result, the driver 15 to drive the process unit 2 is separated from the rear plate 12.

The driver 15 according to the comparative example is directly positioned and fixed to the rear plate 12' of the housing as illustrated in FIG. 1C. In this case, a space from the end of the photoconductor indicated by a dashed line to the rear plate 12' in FIG. 1C is outside the image formation area but is not enough to arrange various mechanisms and structures. The mechanisms and structures of devices to form the image, such as the sheet feeding device, the transfer device, or the fixing device cannot be arranged in the space from the end of the photoconductor indicated by the dashed line to the rear plate 12'. As a result, dead spaces 7*a* and 7*b* are formed.

Although component arrangement spaces 8*a* and 8*b* are formed outside the dead spaces 7*a* and 7*b* (that is, outside the rear plate 12') as illustrated in FIG. 1C, the rear plate 12' moved from the position of the rear plate 12 in FIG. 1D to the outside of the image forming apparatus reduces the size of the component arrangement spaces 8*b* and 8*a*. As a result, the components that can be arranged in the component arrangement spaces 8*a* and 8*b* are restricted, or the size of the image forming apparatus increases.

In the present embodiment, moving the rear plate 12 inward as illustrated in FIG. 1D results in the separation of the driver 15 from the rear plate 12 as described above. For this reason, the driver 15 is positioned and fixed to the rear plate 12 via the bracket 14.

The above-described structure in the present embodiment can form the component arrangement spaces 8*a*' and 8*b*' having a margin larger than the component arrangement spaces 8*a* and 8*b* in the comparative example above and below the driver 15. These component arrangement spaces 8*a*' and 8*b*' have larger margins in the front-back direction that is the left-right direction of FIG. 1D than the component arrangement spaces 8*a* and 8*b* in FIG. 1C. As a result, various components related to image formation can be arranged in the component arrangement spaces 8*a*' and 8*b*', which can reduce the size of the image forming apparatus 1.

Figure 2A:
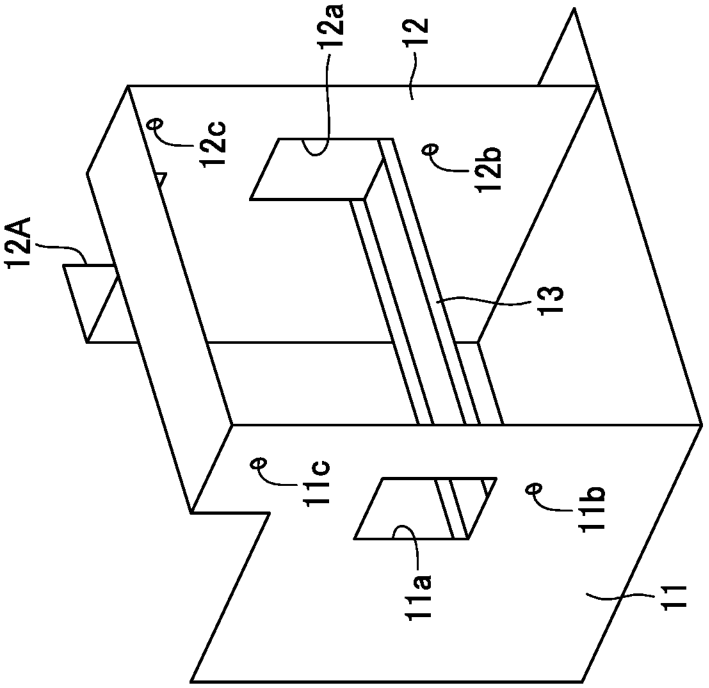
FIG. 2A is a perspective view of a housing of the image forming apparatus obliquely viewed from the front of the image forming apparatus.
Figure 2B:
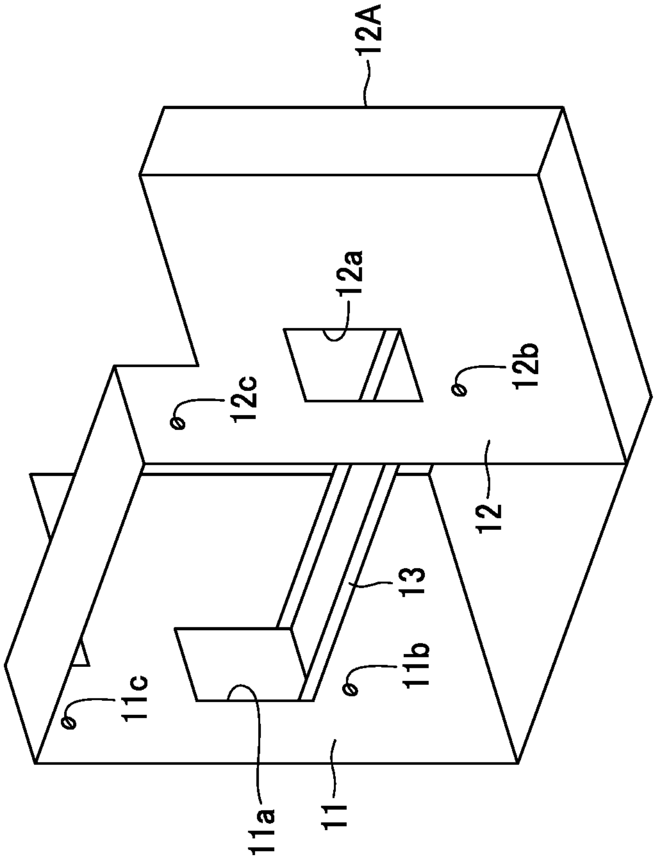
FIG. 2B is a perspective view of the housing of the image forming apparatus obliquely viewed from the rear of the image forming apparatus.

The present embodiment is described below in detail with reference to FIGS. 2 to 20. FIG. 2A is a perspective view of the housing of the image forming apparatus 1 obliquely viewed from the front of the image forming apparatus 1, and FIG. 2B is a perspective view of the housing of the image forming apparatus 1 obliquely viewed from the rear of the image forming apparatus.

The front plate 11 and the rear plate 12 are arranged to face each other. The front plate 11 has a rectangular opening 11*a*, and the rear plate 12 has a rectangular opening 12*a*. Between the openings 11*a* and 12*a*, a guide plate 13 is disposed to horizontally guide the process unit 2 inserted into the opening 11*a* of the front plate 11.

The front plate 11 has a support hole 11*c* above the opening 11*a* to support sheet ejection rollers and a support hole 11*b* below the opening 11*a* to support sheet conveyance rollers, and the rear plate 12 has a support hole 12*c* above the opening 12*a* to support the sheet ejection rollers and a support hole 12*b* below the opening 12*a* to support the sheet conveyance rollers.

Figure 3B:
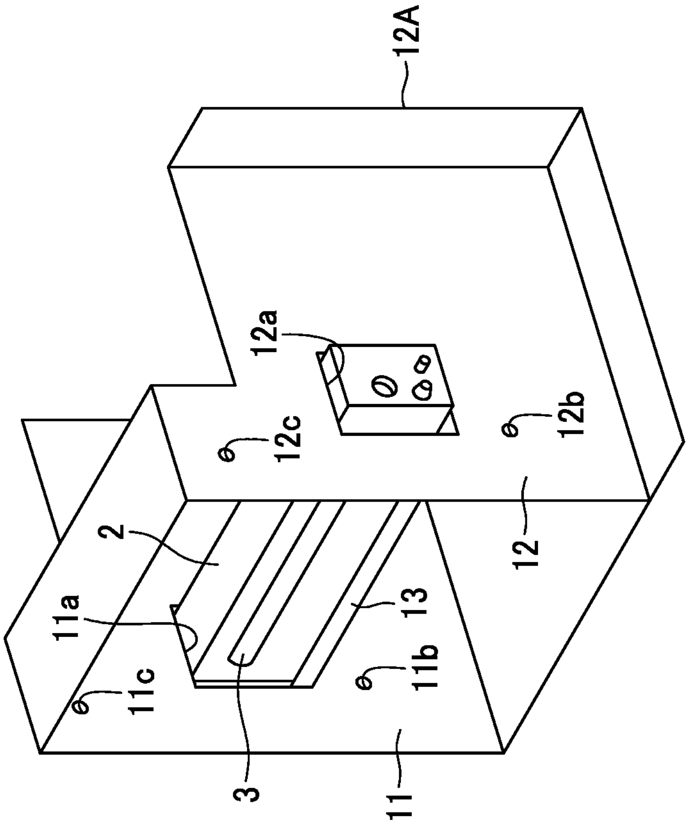
FIG. 3B is a perspective view of the housing to which the process unit is installed obliquely viewed from the rear of the image forming apparatus.
Figure 3A:
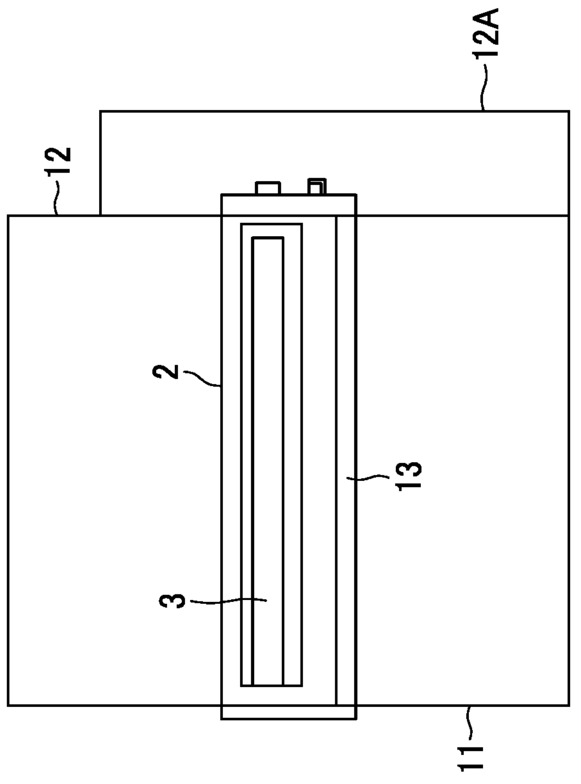
FIG. 3A is a schematic cross-sectional side view of the housing in which a process unit is installed.

FIG. 3A is a schematic cross-sectional side view of the housing to which the process unit 2 is installed, and FIG. 3B is a perspective view of the housing to which the process unit 2 is installed obliquely viewed from the rear of the image forming apparatus. Moving the rear plate 12 inward, that is, toward the front plate 11 causes the long one end of the process unit 2 (in other words, a long rear end portion of the process unit 2) to project from the outer face of the rear plate 12 (in other words, the right side of the rear plate 12 in FIG. 1D) to the outside. The process unit 2 includes gears on the rear end portion of the process unit 2 to drive the photoconductor 3 and the developing device.

Figure 4B:
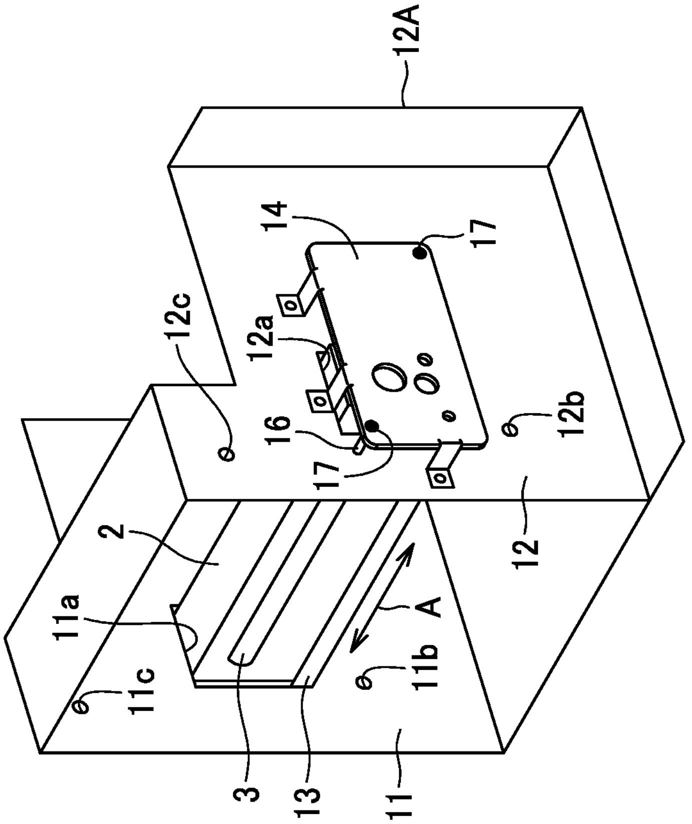
FIG. 4B is a perspective view of the housing of FIG. 3B to which the bracket is attached obliquely viewed from the rear of the image forming apparatus.
Figure 4A:
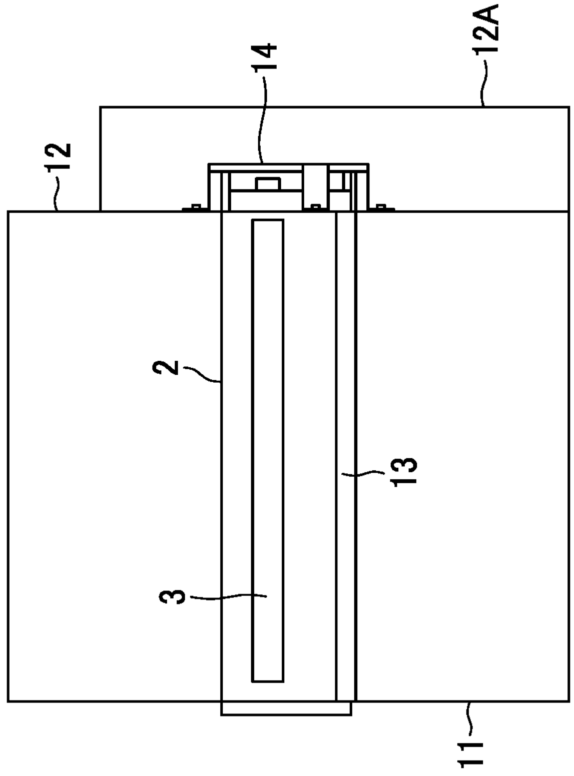
FIG. 4A is a schematic cross-sectional side view of the housing of FIG. 3A to which a bracket is attached.

The bracket 14 is described below. FIG. 4A is a schematic cross-sectional side view of the housing of FIG. 3 in which the bracket 14 is attached to the rear plate 12, and FIG. 4B is a perspective view of the housing of FIG. 3 in which the bracket 14 is attached to the rear plate 12 obliquely viewed from the rear of the image forming apparatus. The bracket 14 is positioned and fixed on the rear plate 12 using two support shafts 16 illustrated in FIG. 6.

To position and support the driver 15, the bracket 14 is positioned and attached to the rear plate 12 of the housing of the image forming apparatus with high accuracy. In the present embodiment, the two support shafts 16 can position the bracket 14 on the rear plate 12 with high accuracy.

The bracket 14 has a size necessary and sufficient for mounting the driver 15 in the height direction and the width direction of the image forming apparatus 1. Spaces on the outer face of the rear plate 12 that are not occupied by the bracket 14, that is, the spaces above and below the bracket 14, a space left from the bracket 14, and a space right from the bracket 14 may be used to arrange other units. In addition, a space behind the driver 15 may be used to arrange the other units.

The area of the bracket 14 is nearly twice as large as the projected area of the process unit 2 in the axial direction of the process unit 2 (in other words, a longitudinal direction of the process unit 2) or the insertion and removal direction (that is indicated by an arrow A in FIG. 4B) with respect to the bracket 14. The area of the bracket 14 is also considerably larger than the area required to attach the driver 15 to the bracket 14.

Figure 19:
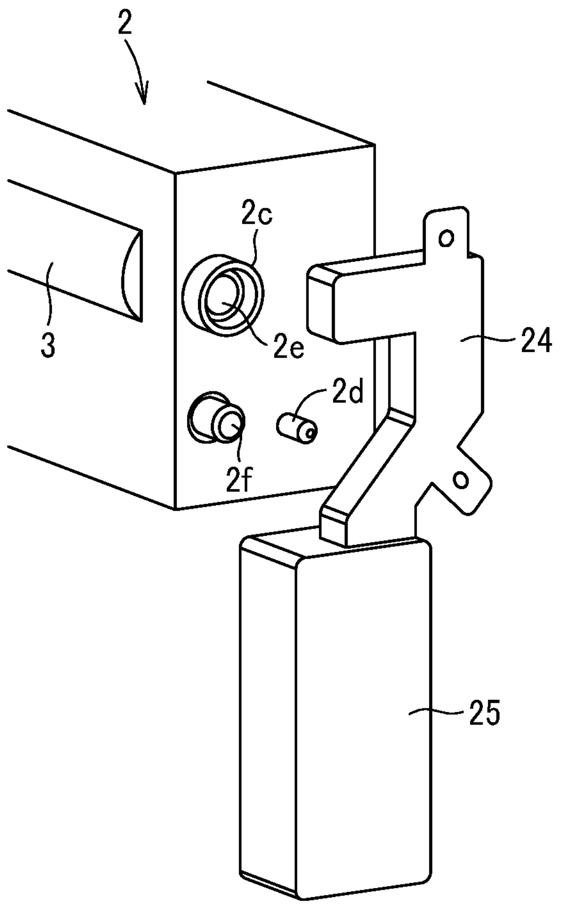
FIG. 19 is a perspective view of a waste toner discharge pipe and the one end of the process unit to be coupled to the waste toner discharge pipe.

The reason why the bracket 14 is made larger in this way is that a waste toner discharging pipe 24 and a drive gear 26*b* are positioned and fixed on the back side of the bracket 14 (in other words, an inner face of the bracket 14) as described below with reference to FIGS. 19 and 20. If the waste toner discharging pipe 24 and the drive gear 26*b* are not fixed on the bracket 14, the size of the bracket 14 may be a minimum size to assemble the driver 15.

Figure 5B:
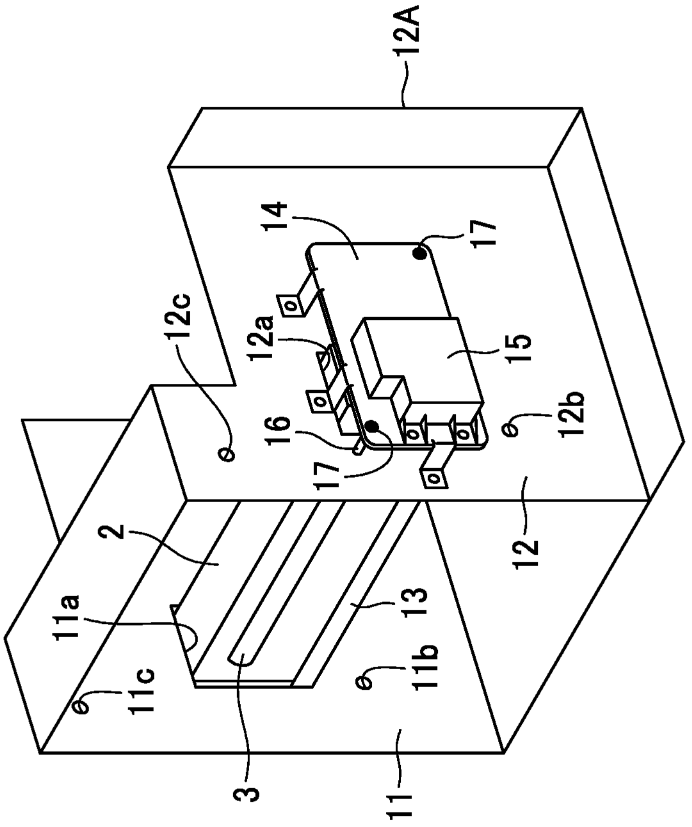
FIG. 5B is a perspective view of the housing of FIG. 4B to which the driver is attached obliquely viewed from the rear of the image forming apparatus.
Figure 5A:
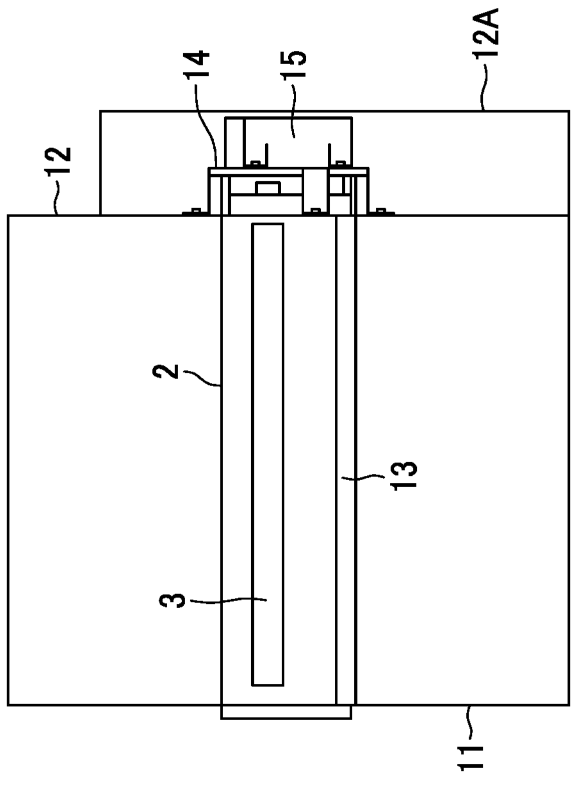
FIG. 5A is a schematic cross-sectional side view of the housing of FIG. 4A to which a driver is attached.

FIG. 5A is a schematic cross-sectional side view of the housing to which the bracket 14 is attached, and the driver 15 is attached on the outer face of the bracket 14. FIG. 5B is a perspective view of the housing of FIG. 5A obliquely viewed from the rear of the image forming apparatus. In FIG. 5A, a right end of the driver 15 extends to the vicinity of a folded portion 12A of the rear plate 12. An exterior member is disposed outside the folded portion 12A.

The rear plate 12 in the present embodiment is arranged closer to the front plate 11 than the rear plate in the comparative example. As a result, a space upper the driver 15 in FIGS. 5A and 5B, a space below the driver 15 in FIGS. 5A and 5B, and a space from the right side of the driver 15 in FIG. 5B each have sufficient room as the component arrangement space.

Figure 6:
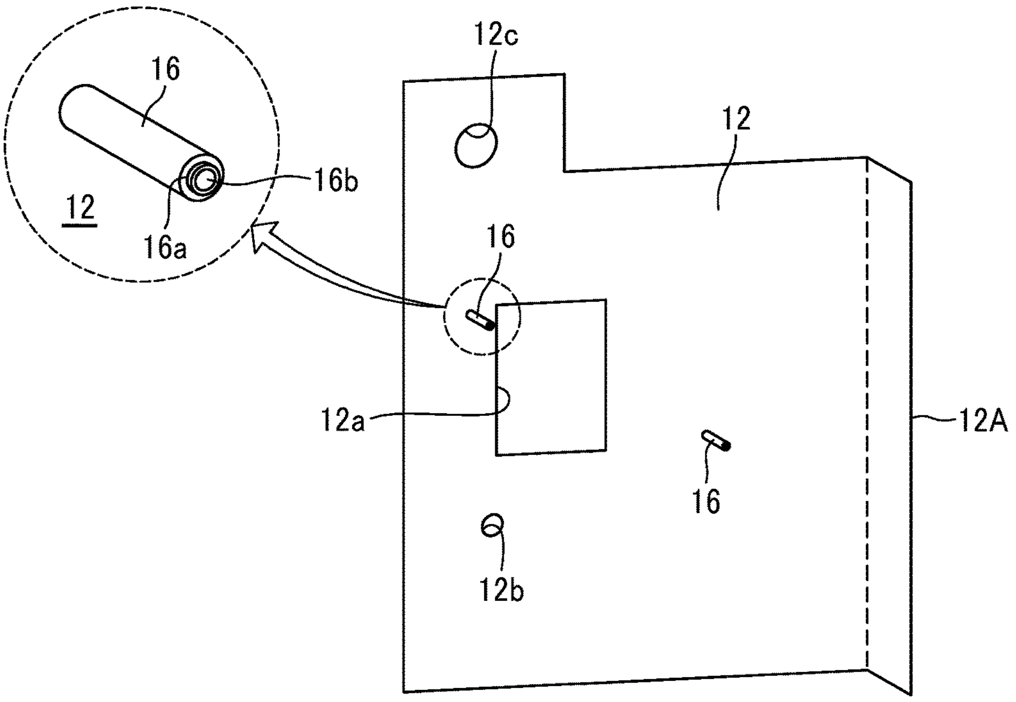
FIG. 6 is a perspective view of the rear plate on which support shafts are fixed by caulking.

The support shafts 16 are described below. FIG. 6 is a perspective view of the rear plate 12. As illustrated in FIG. 6, the two support shafts 16 are fixed on the rear plate 12 by caulking. The bases of the two support shafts 16 are extremely accurately caulked and fixed to the predetermined positions of the outer face of the rear plate 12. The bracket 14 and the support shafts 16 serve as the positioner to position the driver 15.

The support shafts 16 are made of a steel material such as steel use stainless (SUS). The support shaft 16 is positioned and fixed to the rear plate 12 by using a caulking method, which enables positioning the support shaft 16 perpendicular to the rear plate 12 with high accuracy.

As illustrated in an enlarged view of FIG. 6, the support shaft 16 has a tip cylindrical portion 16*a* and a female screw hole 16*b* for screw fastening on a distal end of the support shaft 16. The tip cylindrical portions 16*a* of the two support shafts are fitted to support shaft fitting holes 14*a* and 14*b* of the bracket 14.

Figure 8A:
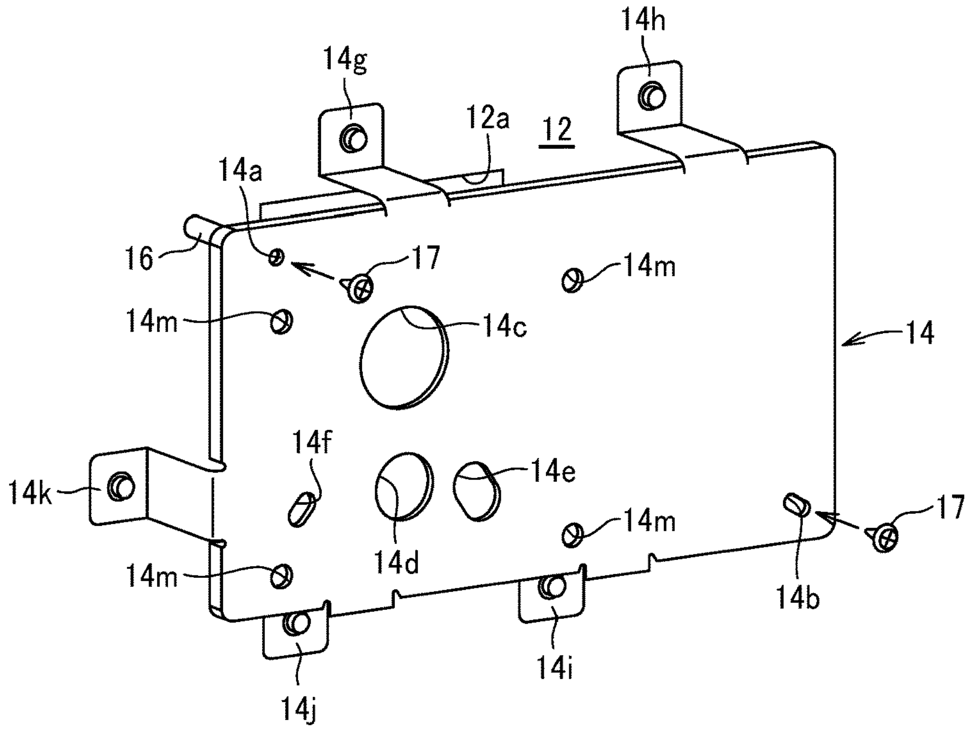
FIG. 8A is a perspective view of the bracket and screws to be screwed to the support shafts on the rear plate.
Figure 8B:
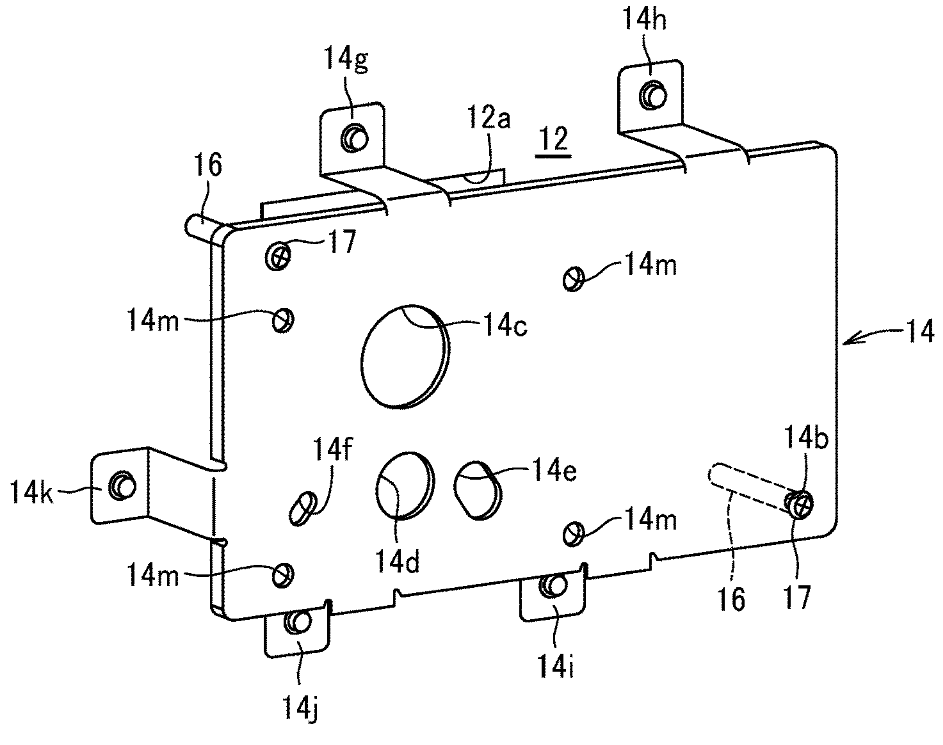
FIG. 8B is a perspective view of the bracket screwed to the support shafts on the rear plate.

The height of the tip cylindrical portion 16*a* is substantially equal to the thickness of a plate-shaped body of the bracket 14. The female screw hole 16*b* is formed in the axis of the tip cylindrical portion 16*a*. Fastening screws 17 into the female screw holes 16*b* as illustrated in FIGS. 8A and 8B fixes the bracket 14 to the support shafts 16 and thus fixes the bracket 14 at a predetermined position on the rear plate 12.

The two support shafts 16 are obliquely arranged across the rectangular opening 12*a* of the rear plate 12. In other words, the two support shafts 16 are arranged across a diagonal line of the rectangular opening 12*a*. In addition, the two support shafts 16 are on a diagonal line of the plate-shaped body of the bracket 14. One end of the process unit 2 passes through the opening 12*a* and projects from the rear plate 12 toward the outside of the image forming apparatus (in other words, to the rearward of the image forming apparatus).

The two support shafts 16 are obliquely arranged in order to make the distance between the support shafts 16 as long as possible. Using the two support shafts 16 which are separated from each other by a long distance to position and fix the bracket 14 increases the positioning accuracy of the bracket 14 and the positioning accuracy of the driver 15. The bracket is described below.

Figure 7:
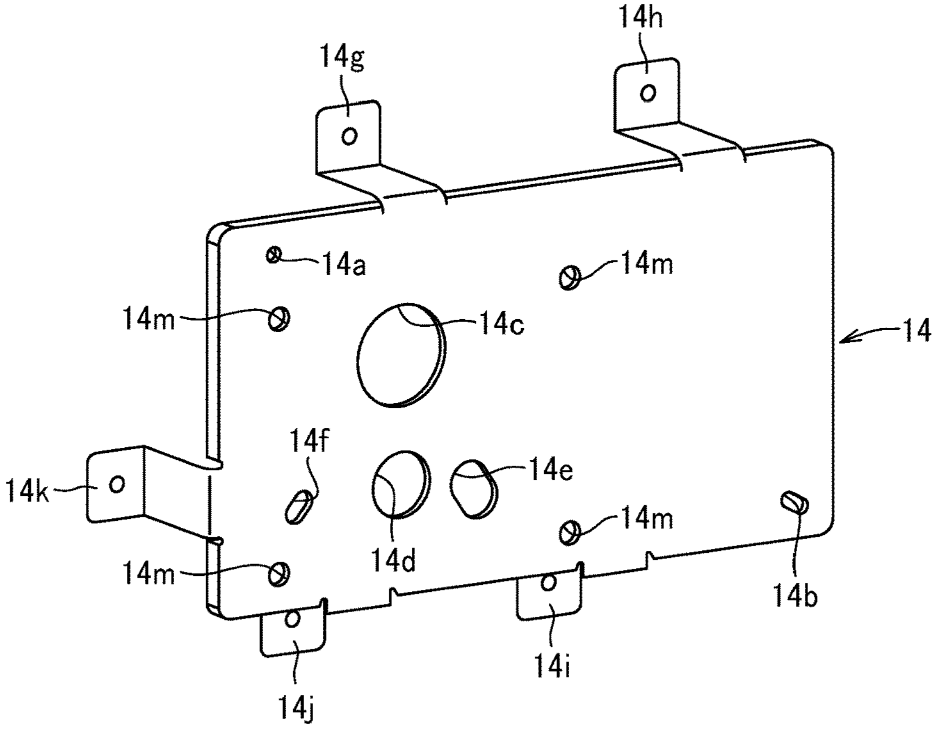
FIG. 7 is a perspective view of a bracket.

FIG. 7 is a perspective view of the bracket 14. The bracket 14 includes the plate-shaped body having a horizontally long rectangular shape and L-shaped leg portions 14*g* to 14*k* integrally formed on the sides of the plate-shaped body.

Support shaft fitting holes 14*a* and 14*b* are formed at two corners of the plate-shaped body on a diagonal line of the plate-shaped body. Each of the tip cylindrical portions 16*a* of the support shafts 16 are fitted into any one of the support shaft fitting holes 14*a* and 14*b*.

The support shaft fitting hole 14*a* is a round hole, but the support shaft fitting hole 14*b* is an elongated hole. The elongated hole of the support shaft fitting hole 14*b* extends toward the support shaft fitting hole 14*a* in a diagonal direction.

The support shaft fitting hole 14*a* that is the round hole serves as a first positioning hole as a main reference for positioning, and the support shaft fitting hole 14*b* that is the elongated hole serves as a second positioning hole as a sub-reference for positioning. Fitting the tip cylindrical portion 16*a* of the support shaft 16 to the support shaft fitting hole 14*b* that is the elongated hole determines a position of the bracket 14 in a rotation direction around the support shaft fitting hole 14*a*.

The height of the tip cylindrical portion 16*a* is substantially equal to the thickness of the plate-shaped body of the bracket 14. The female screw hole 16*b* is formed in the axis of the tip cylindrical portion 16*a*. Fastening screws 17 into the female screw holes 16*b* as illustrated in FIGS. 8A and 8B fixes the bracket 14 to the support shafts 16 and thus fixes the bracket 14 at a predetermined position on the rear plate 12.

Figure 9B:
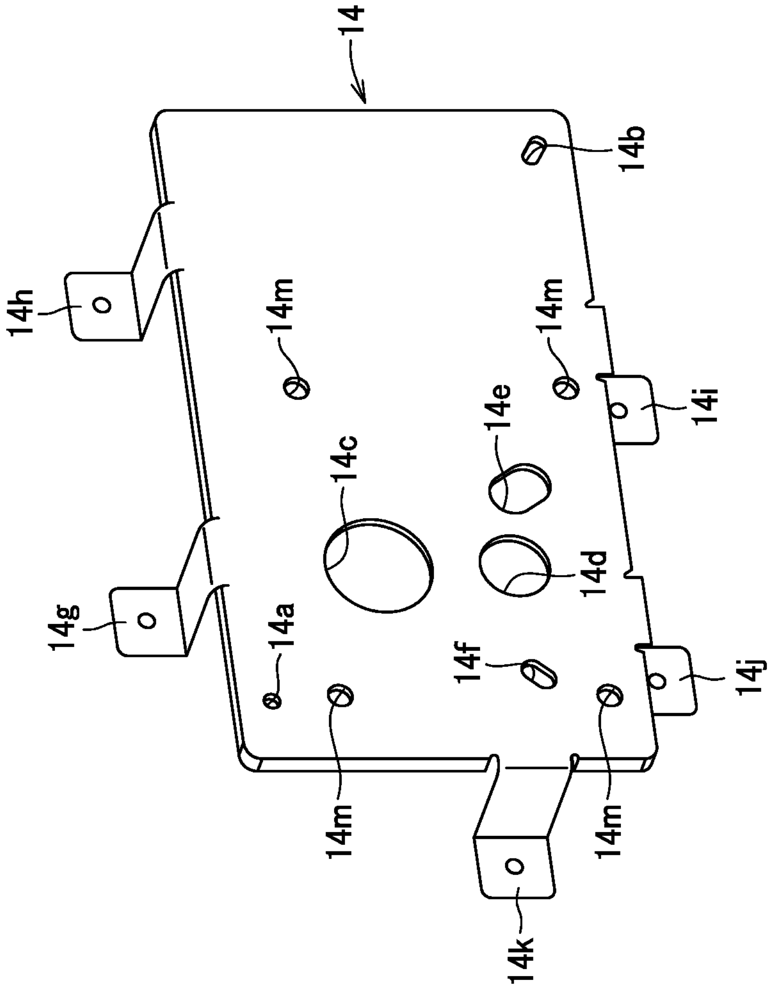
FIG. 9B is the perspective view of the bracket.
Figure 9A:
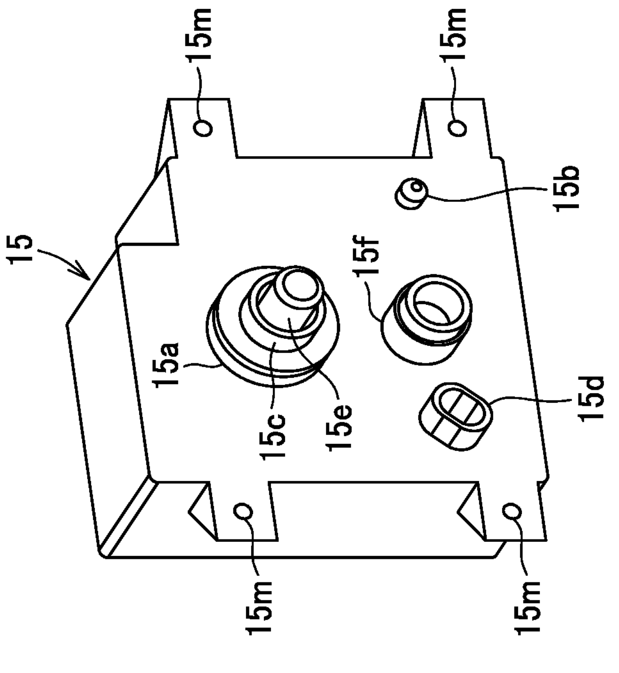
FIG. 9A is a perspective view of a driver.

As illustrated in FIG. 9B, the plate-shaped body of the bracket 14 has holes 14*c* to 14*f*. As illustrated in FIG. 9A, the driver 15 has a circular projection 15*a*, a small cylinder 15*b*, an elliptical projection 15*d*, and a cylindrical developing roller driving gear 15*f* each of which passes through any one of the holes 14*c* to 14*f*. The corresponding relationship of the above-described parts and holes is illustrated in FIGS. 9A and 9B.

Figure 11A:
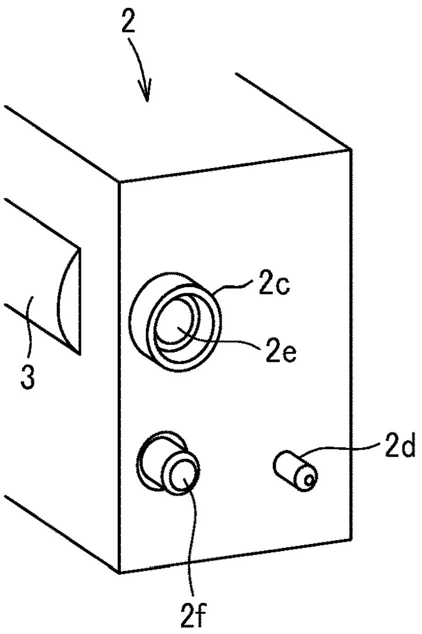
FIG. 11A is a perspective view of one end of a process unit.
Figure 11B:
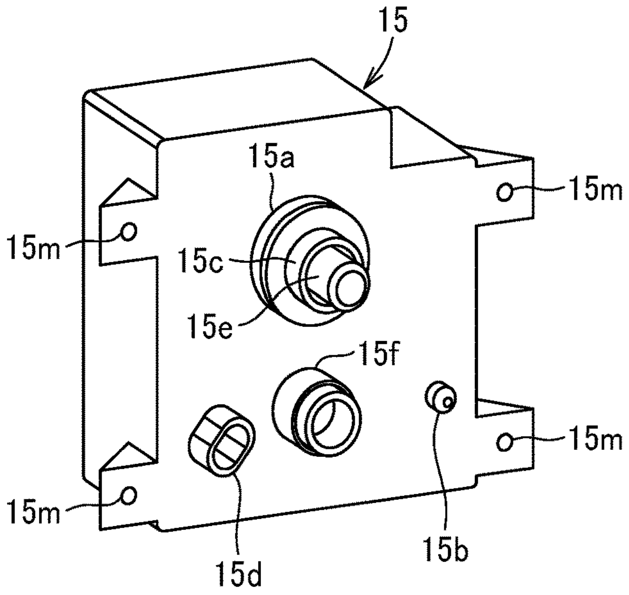
FIG. 11B is the perspective view of the driver.

The elliptical projection 15*d* has an elongated hole extending toward a photoconductor drive gear 15*e*. As illustrated in FIGS. 11A and 11B, a projection 2*d* of the process unit 2 is fitted into the elongated hole inside the elliptical projection 15*d*.

The photoconductor drive gear 15*e* meshes with a photoconductor drive gear 2*e* of the process unit 2. As a result, in the positioning relationship between the process unit 2 and the driver 15, the photoconductor drive gear 15*e* serves as a main reference for positioning, and the elliptical projection 15*d* serves as a sub-reference for positioning.

It is desirable that the circular projection 15*a* as a first projection of the driver 15 is fitted to the hole 14*c* of the bracket 14 with a minimum dimensional tolerance. Fitting the circular projection 15*a* of the driver 15 to the hole 14*c* of the bracket 14 with the minimum dimensional tolerance accurately aligns the axis of the photoconductor drive gear 15*e* of the driver 15 with the hole 14*c* of the bracket 14.

The small cylinder 15*b* as a second projection of the driver 15 is fitted into a hole 14*f* of the bracket 14. The hole 14*f* is an elongated hole extending toward the hole 14*c*.

The hole 14*c* is a round hole serves as a third positioning hole as a main reference for positioning, and the hole 14*f* that is the elongated hole serves as a fourth positioning hole as a sub-reference for positioning. Fitting the small cylinder 15*b* of the driver 15 into the hole 14*f* of the bracket 14 determines a position of the driver 15 in a rotation direction around the hole 14*c* that is the round hole and serves as the main reference of the bracket 14 for positioning.

The photoconductor drive gear 15*e* is concentrically disposed with the circular projection 15*a* of the driver 15 and projects from the circular projection 15*a*. The photoconductor drive gear 15*e* meshes with the photoconductor drive gear 2*e* of the process unit 2 in FIG. 11 to transmit the driving force from the driver 15 to the process unit 2.

Between the circular projection 15*a* and the photoconductor drive gear 15*e*, a circular projection 15*c* is disposed. The circular projection 15*c* is fitted into the inside of a cylinder 2*c* formed on the outer periphery of the photoconductor drive gear 2*e* of the process unit 2 illustrated in FIG. 11A. An interdigitation of the circular projection 15*c* and the cylinder 2*c* can enhance the concentricity of the photoconductor drive gears 15*e* and 2*e*.

As illustrated in FIG. 9A, the driver 15 has screw holes 15*m* at four positions on the left, right, top and bottom of the driver 15. As illustrated in FIG. 9B, the bracket 14 has screw holes 14*m* at four positions of the plate-shaped body of the bracket 14.

Figure 10:
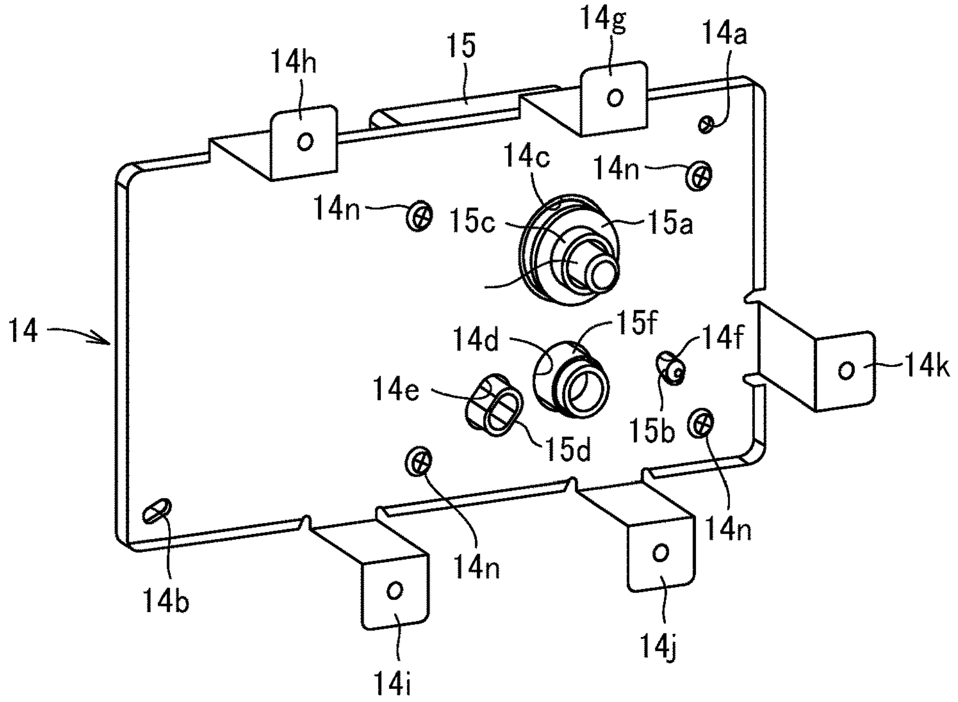
FIG. 10 is a perspective view of the bracket to which the driver is attached, as viewed from the back side of the bracket.

As illustrated in FIG. 10, four screws 14*n* are screwed into the four screw holes 14*m* of the bracket 14 from the back side of the bracket 14, pass through the plate-shaped body of the bracket 14, and are screwed into the screw holes 15*m* of the driver 15.

The driver 15 is positioned and fixed to the bracket 14 as illustrated in FIG. 10, and the bracket 14 is positioned and fixed to the rear plate 12. Subsequently, the process unit 2 is inserted into the opening 11*a* of the front plate 11 and slides along the guide plate 13. Then, the photoconductor drive gear 2*e* meshes with the photoconductor drive gear 15*e*, which can be seen from FIGS. 11A and 11B. Parts of the process unit 2 fit to parts of the driver 15 as follows.

The photoconductor drive gear 2*e* meshes with the photoconductor drive gear 15*e*.

The circular projection 15*c* is fitted into the inside of the cylinder 2*c*.

The projection 2*d* is fitted into the elongated hole inside the elliptical projection 15*d*.

A developing roller driving gear 2*f* meshes with the developing roller driving gear 15*f*.

Figure 12B:
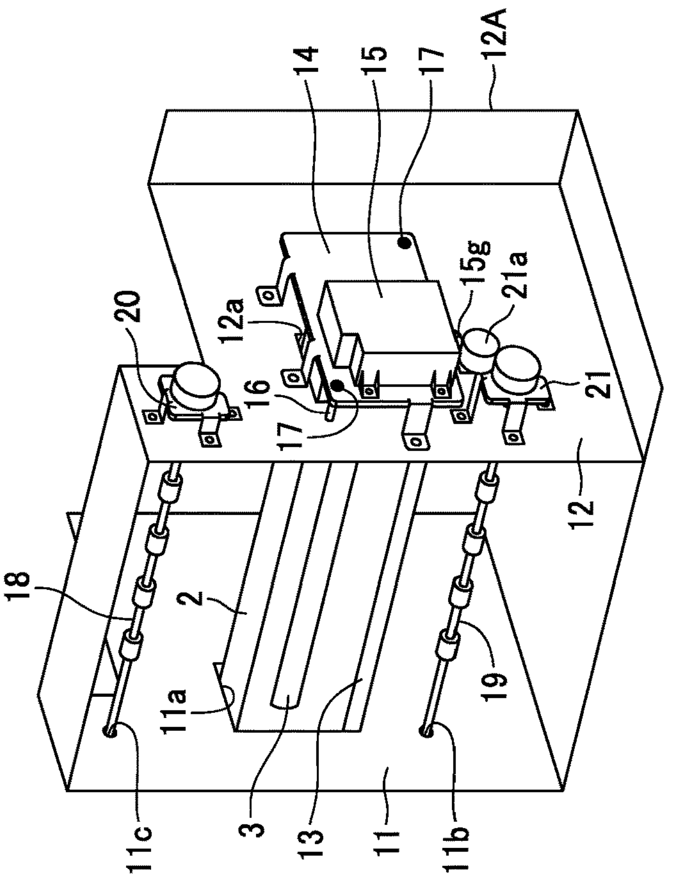
FIG. 12B is a perspective view of the housing of FIG. 12A obliquely viewed from the rear of the image forming apparatus.
Figure 12A:
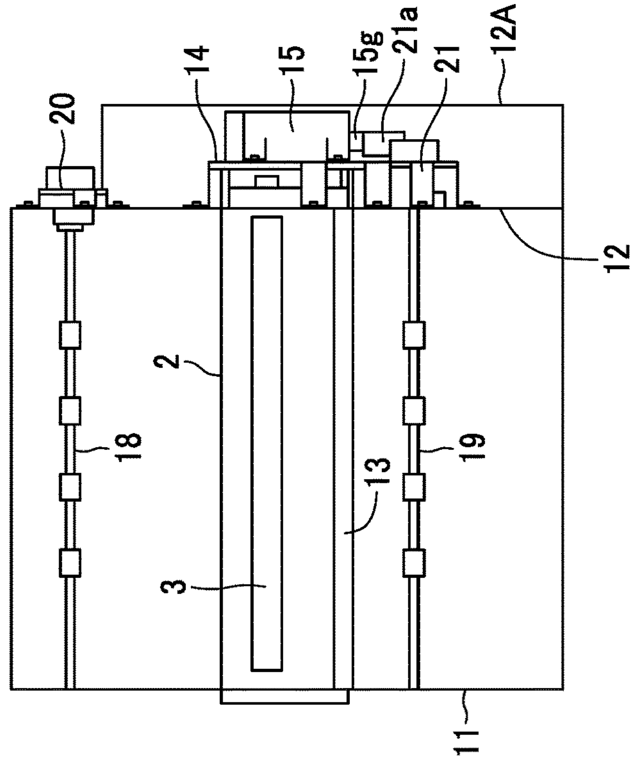
FIG. 12A is a schematic cross-sectional side view of the housing of FIG. 1D to which sheet ejection rollers and sheet conveyance rollers are attached.

FIG. 12A is a schematic cross-sectional side view of the housing of FIG. 1D to which sheet ejection rollers 18 and sheet conveyance rollers 19 are attached, and FIG. 12B is a perspective view of the housing of FIG. 12A obliquely viewed from the rear of the image forming apparatus. As illustrated in FIGS. 12A and 12B, the spaces around the driver 15 are effectively used as the component arrangement spaces. A sheet ejection roller driver 20 to drive the sheet ejection rollers 18 is in the space above the driver 15. A sheet conveyance roller driver 21 to drive the sheet conveyance rollers 19 is in the space below the driver 15. However, these are examples, and the usage of spaces around the driver 15 is not limited to these.

As illustrated in FIGS. 12A and 12B, the sheet ejection roller driver 20 to drive the sheet ejection rollers 18 may be disposed above the bracket 14 and attached to the rear plate 12, and the sheet conveyance roller driver 21 to drive the sheet conveyance rollers 19 may be disposed below the bracket 14 and attached to the rear plate 12. A unit such as the sheet ejection roller driver 20 or the sheet conveyance roller driver 21 to drive a mechanism disposed between the front plate 11 and the rear plate 12, such as the sheet ejection rollers 18 or the sheet conveyance rollers 19 may be directly attached to the outer face of the rear plate 12.

Figure 13:
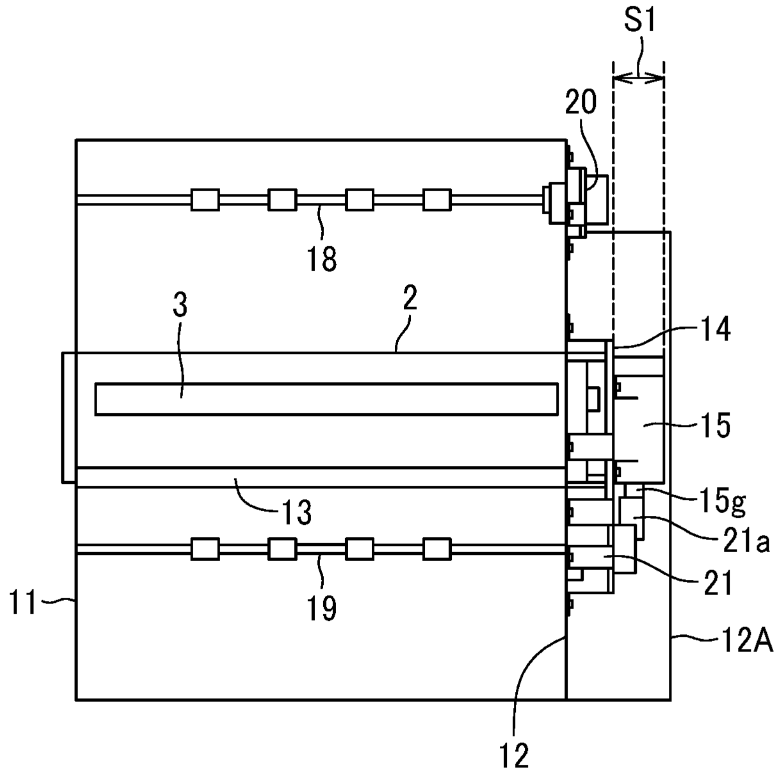
FIG. 13 is the schematic cross-sectional side view of the housing of FIG. 12A to illustrate a space S1 in the housing.

A space S1 produced by the present disclosure is described below. FIG. 13 is the schematic cross-sectional side view of the housing of FIG. 12A to illustrate the space S1 formed behind the bracket 14. A component may be disposed in the space S1 behind the bracket 14 (in other words, the space S1 from a right side of the bracket 14 in FIG. 13).

Figure 14A:
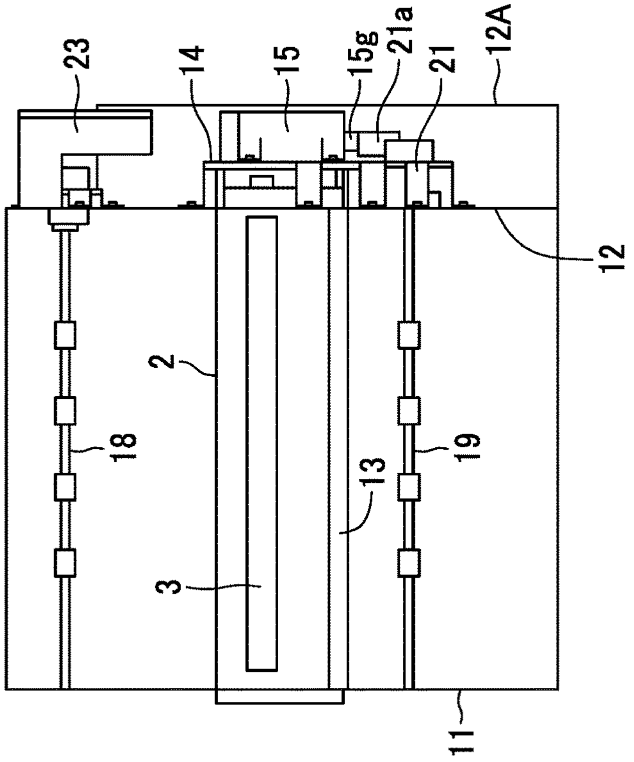
FIG. 14A is a schematic cross-sectional side view of the housing in which a fan duct unit is disposed by using the space S1.
Figure 14B:
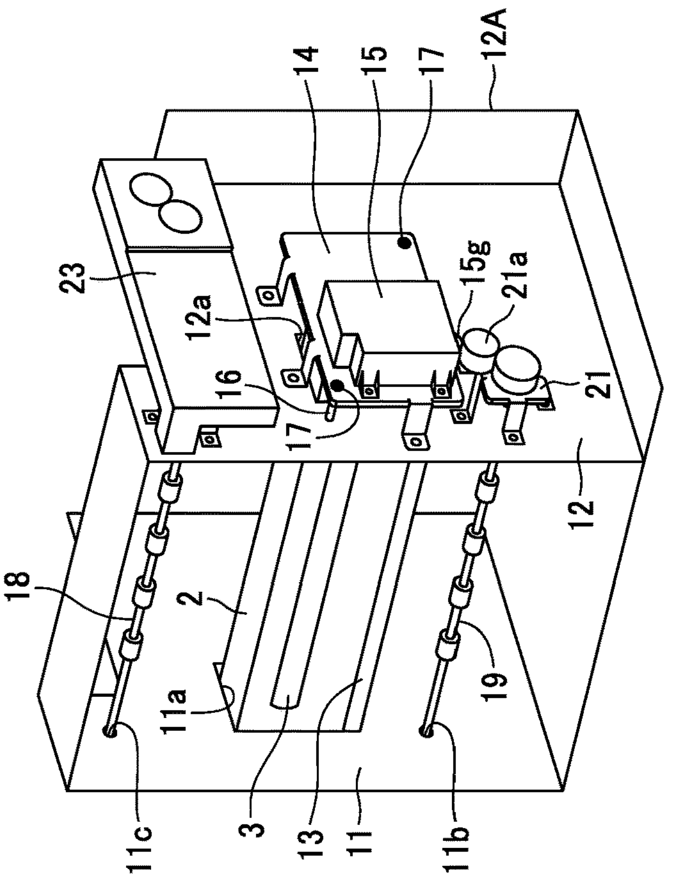
FIG. 14B is a perspective view of the housing of FIG. 14A obliquely viewed from the rear of the image forming apparatus.

Another unit may be disposed in the space S1 between an end of the driver 15 and the sheet ejection roller driver 20 in the axial direction of the photoconductor as illustrated in FIG. 13. For example, as illustrated in FIGS. 14A and 14B, a fan duct unit 23 to exhaust heat from the fixing device 8 and the sheet ejection device 10 may be disposed in the space S1.

The above-described fan duct unit 23 has a relatively large thickness in the front-back direction of the housing. It is not necessarily easy to dispose the fan duct unit 23 in the component arrangement space 8*a* or 8*b* formed by the position of the rear plate 12' according to the comparative example illustrated in FIG. 1C. In contrast, moving the rear plate 12 toward the front side of the housing can increase the size of the component arrangement spaces 8*a*' and 8*b*' in the front-back direction as illustrated in FIG. 1D. As a result, even a component having the relatively large thickness in the front-back direction, such as the fan duct unit 23, can be easily disposed in the present embodiment.

Figure 15:
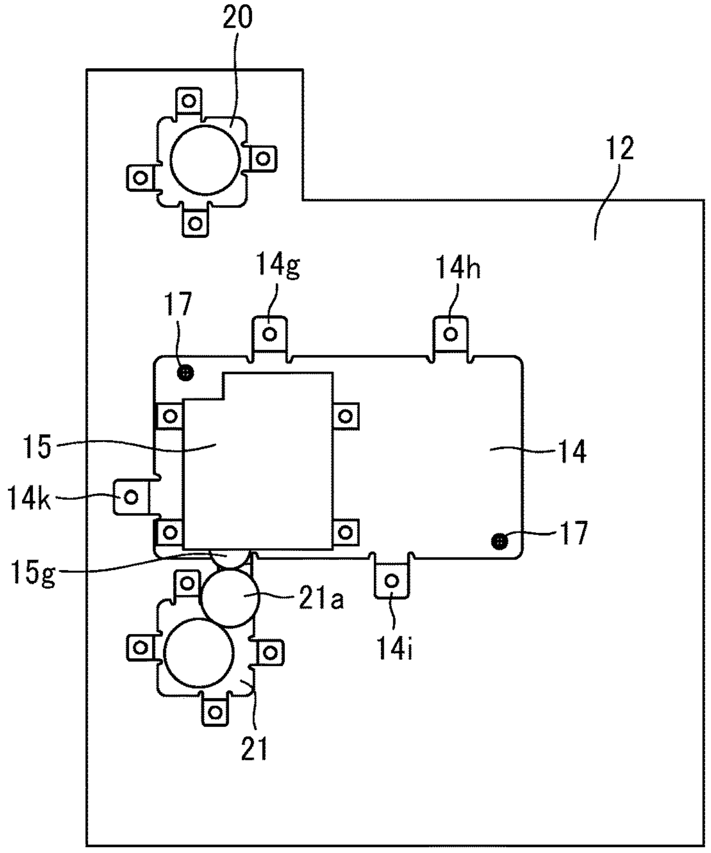
FIG. 15 is a front view of the rear plate to which the driver, the sheet ejection roller driver, and the sheet conveyance roller driver are attached.
Figure 16:
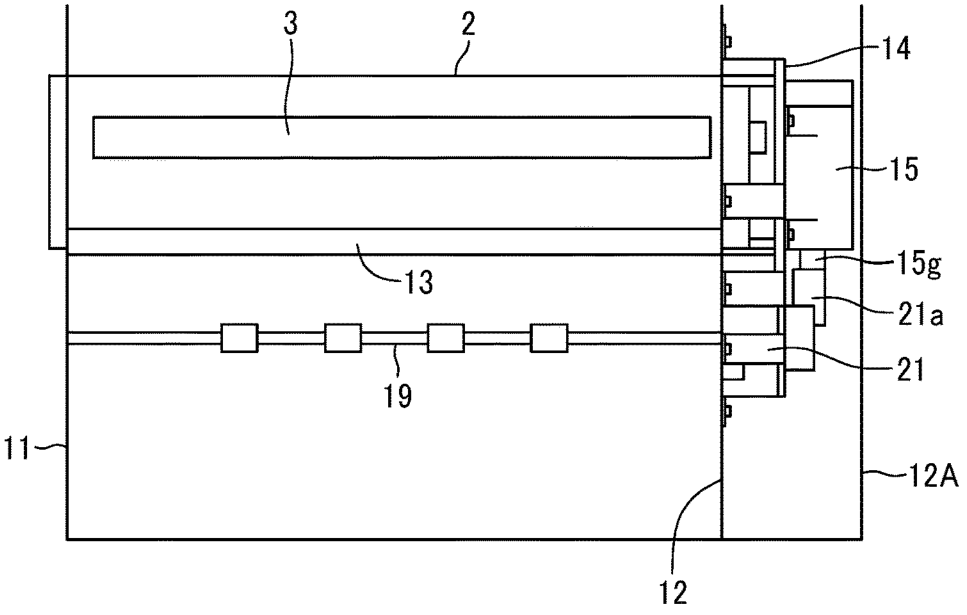
FIG. 16 is a schematic cross-sectional side view of the housing including the rear plate of FIG. 15 to illustrate a gear of the driver and a gear of the sheet conveyance roller driver that are meshed with each other.

The following describes a relationship between a sheet conveyance roller drive gear and the size of the image forming apparatus. FIG. 15 is a front view of the rear plate 12 to which the driver 15, the sheet ejection roller driver 20, and the sheet conveyance roller driver 21 are attached. FIG. 16 is a schematic cross-sectional side view of the housing including the rear plate of FIG. 15 to illustrate a gear of the driver and a gear of the sheet conveyance roller driver that are meshed with each other. To transmit the driving force from the driver 15 to the sheet conveyance roller driver 21, the driver 15 includes a sheet conveyance roller drive gear 15*g*, and the sheet conveyance roller driver 21 includes a sheet conveyance roller drive gear 21*a* that meshes with the sheet conveyance roller drive gear 15*g* as illustrated in FIG. 15. In the above-described structure, the position of the sheet conveyance roller drive gear 15*g* of the driver 15 is the same as the position of the sheet conveyance roller drive gear 21*a* of the sheet conveyance roller driver 21 in the axial direction of the photoconductor 3 as illustrated in FIG. 16.

Figure 17:
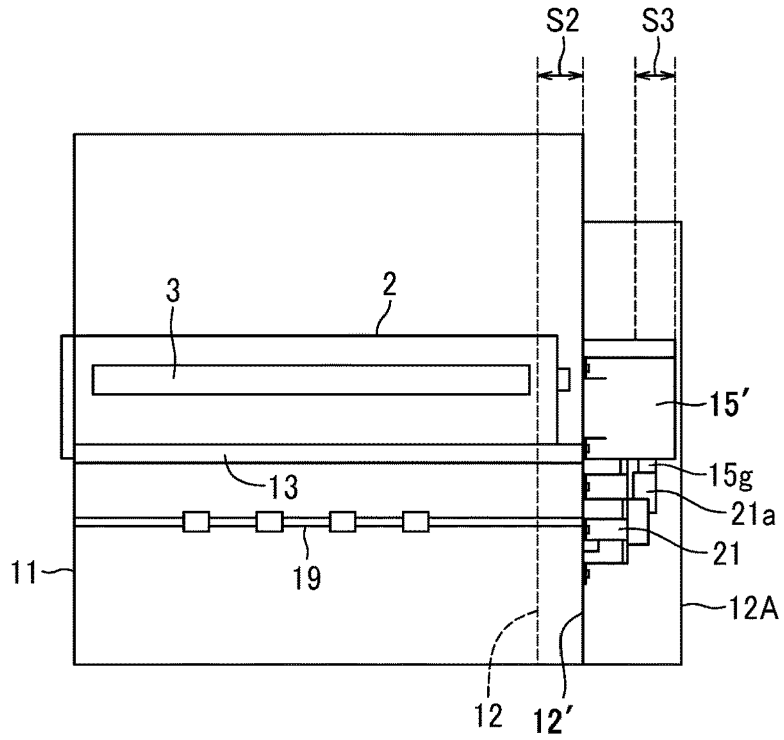
FIG. 17 is a schematic cross-sectional side view of the housing in which the driver is attached to the rear plate without using the bracket to illustrate an increase in a space regarding the driver.

In the image forming apparatus not including the bracket 14, the driver 15' is attached to the rear plate 12' as illustrated in FIG. 17. In the axial direction of the photoconductor 3, the above-described structure shifts the position of the rear plate 12' from the position of the rear plate 12 in the image forming apparatus including the bracket 14 (that is indicated by a dashed line in FIG. 17) to the right side in FIG. 17 by the dimension of the bracket 14 in the axial direction. In other words, a space S2 is formed between the rear plate 12' and the rear plate 12 (that is indicated by a dashed line in FIG. 17) in the present embodiment as illustrated in FIG. 17.

In the above-described structure, the sheet conveyance roller driver 21 attached to the rear plate 12' is also shifted rearward in the axial direction of the photoconductor by an amount corresponding to the space S2 because the drive gears 15*g* and 21*a* are disposed at the same position in the axial direction. As a result, the size of the driver 15' in the axial direction of the photoconductor is increased by an amount of S3 corresponding to the space S2, which leads to an increase in the size of the image forming apparatus 1 in the axial direction of the photoconductor.

Figure 18:
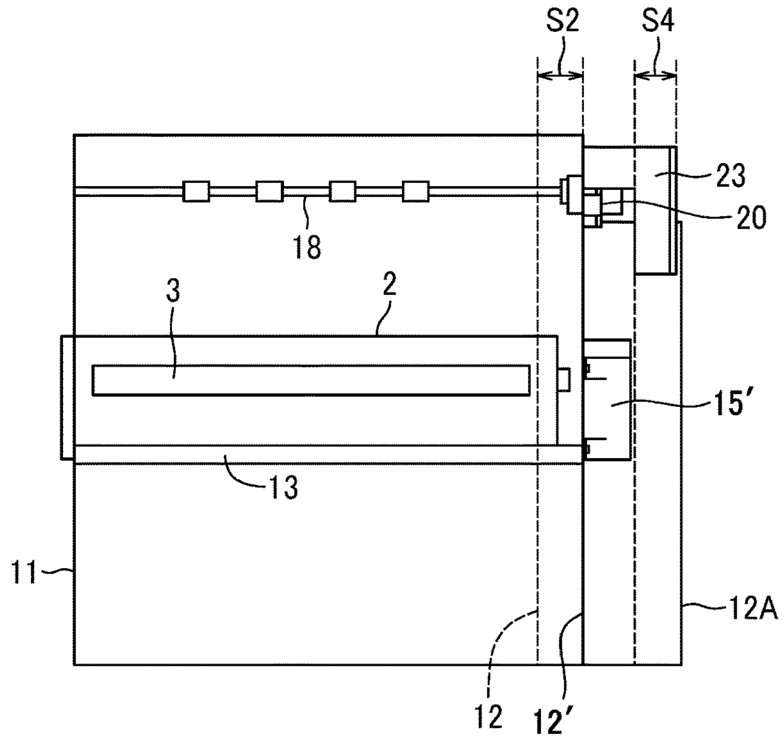
FIG. 18 is a schematic cross-sectional side view of the housing in which the driver is attached to the rear plate without using the bracket to illustrate an increase in a space regarding the fan duct.

Similarly, in the structure including the driver 15' attached to the rear plate 12' without using the bracket 14 as illustrated in FIG. 18, the sheet ejection roller driver 20 is attached to the rear plate 12', and the fan duct unit 23 is disposed behind the sheet ejection roller driver 20. This means that the size of the image forming apparatus 1 in the axial direction of the photoconductor is increased by an amount of a space S4 corresponding to the space S2.

As described above, the structure including the driver 15' attached to the rear plate 12' without using the bracket 14 increases the size of the image forming apparatus 1. In contrast, using the bracket 14 having a size necessary and sufficient for mounting the driver 15 in the height direction and the width direction of the image forming apparatus 1 and using the space behind the rear plate 12 which is not occupied by the bracket 14 for the arrangement of other units can contribute to the miniaturization of the image forming apparatus 1.

The following describes an arrangement of a pipe to correct waste toner. In an image forming process, toner remains on the photoconductor after the toner image is transferred from the photoconductor 3 to the recording medium such as the sheet. Such toner is referred to as waste toner. The waste toner is corrected and stored in a storage such as a bottle 25. As illustrated in FIG. 19, a pipe 24 is connected to the rear end of the process unit 2 to convey the waste toner from the process unit 2 to the bottle 25 and store the waste toner in the bottle 25.

Figure 20B:
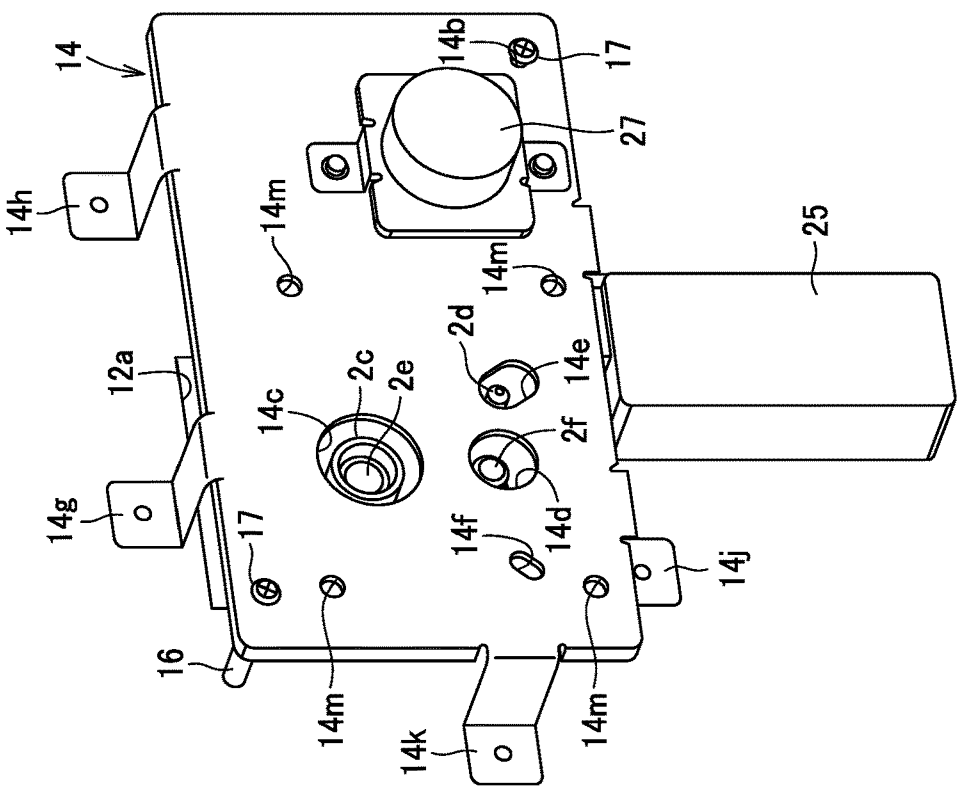
FIG. 20B is a perspective view of a toner conveyance driver attached to an outer face of the bracket of FIG. 20A.
Figure 20A:
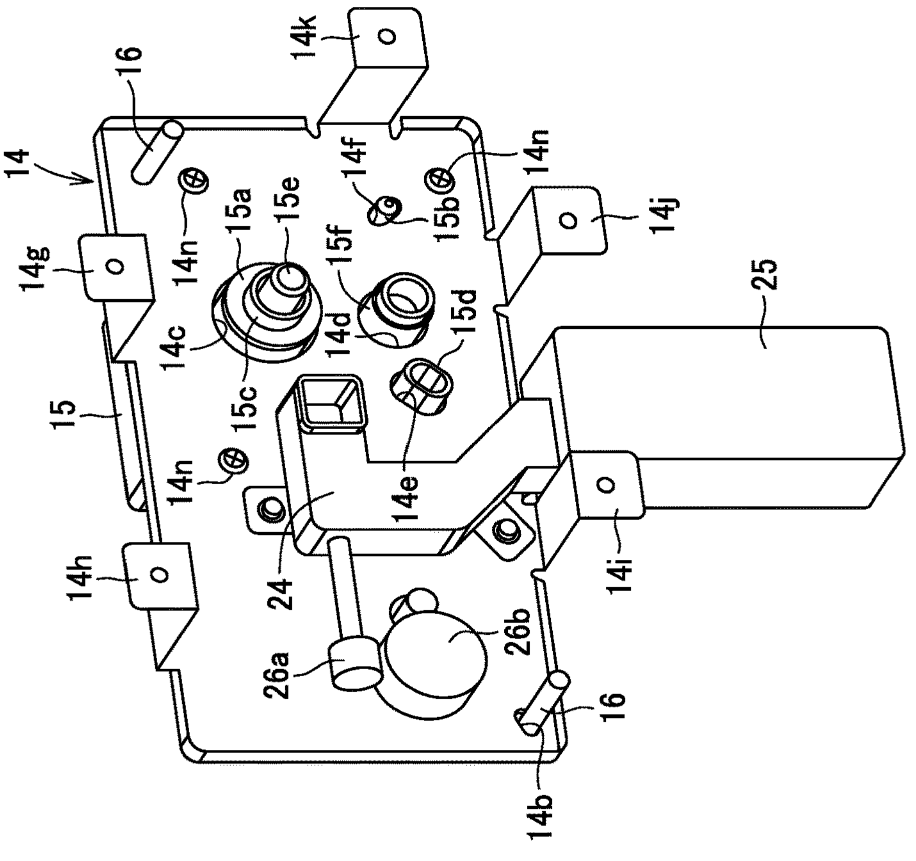
FIG. 20A is a perspective view of the waste toner discharge pipe attached to an inner face of the bracket.

The pipe 24 may be disposed between the rear plate 12 and the bracket 14 and attached to the inner face of the bracket 14 by screws as illustrated in FIGS. 20A and 20B. Drive gears 26*a* and 26*b* may transmit a driving force to a conveyor such as a screw conveyor in the pipe 24 to convey the waste toner in the pipe 24.

As illustrated in FIG. 20B, a toner conveyance driver 27 as a driver to drive the drive gears 26*a* and 26*b* may be attached to the front side of the bracket 14. Designing an area of the face of the bracket 14 to which the driver 15 is attached to be larger than a projected area of the process unit 2 in the lateral direction of the image forming apparatus 1 enables using a part of the area to attach the pipe 24 and the toner conveyance driver 27. In particular, disposing the pipe 24 in the space between the rear plate 12 and the bracket 14 effectively utilizes the space, avoids the occurrence of a dead space, and enhances a reduction in the size of the image forming apparatus 1.

Although the embodiments of the present disclosure are described above, the present disclosure is not limited to the embodiments and can be applied to other embodiments by modification in various forms. For example, the driver 15 in the present embodiment is positioned and fixed to the rear plate 12 via the bracket 14, but the driver 15 may be positioned and fixed without using the bracket 14. The body of the driver 15 illustrated in FIG. 9A may have multiple leg portions integrally formed with the body of the driver 15 to extend to the rear plate 12, and the tips of the leg portions may be directly positioned and fixed to the rear plate 12. In the present embodiment, the process unit 2 is described as the one example of the driven units, but the driven unit may be another unit such as the fixing device 8 including the fixing roller and the pressure roller, the transfer device 6, or a cleaning unit that removes and collects toner remaining on the photoconductor.

The following describes preferred aspects of the present disclosure.

First Aspect

In a first aspect, an image forming apparatus includes a housing, a driven unit, and a driver. The housing includes a pair of plates facing each other. The pair of plates includes a front plate and a rear plate facing the front plate and having an opening. The driven unit is supported by the pair of plates and has one end projecting outside the housing from the opening of the rear plate. The driver is disposed outside the housing and coupled to said one end of the driven unit to drive the driven unit. The driver includes a body separated from an outer face of the rear plate.

Second Aspect

In a second aspect, the driven unit in the image forming apparatus according to the first aspect includes an image bearer having an image forming region on which an image is formed, and said one end projecting from the opening is outside the image forming region in an axial direction of the image bearer.

Third Aspect

In a third aspect, the driven unit in the image forming apparatus according to the first aspect includes a fixing device including a fixing roller and a pressure roller facing the fixing roller.

Fourth Aspect

In a fourth aspect, the driven unit in the image forming apparatus according to the first aspect includes a transfer device.

Fifth Aspect

In a fifth aspect, the image forming apparatus according to any one of the first to fourth aspects further includes a positioner fixed to the outer face of the rear plate, and the body of the driver is fixed to the positioner.

Sixth Aspect

In a sixth aspect, the positioner in the image forming apparatus according to the fifth aspect includes a bracket and multiple shafts fixing the bracket to the outer face of the rear plate, and each of the multiple shafts has one end fixed to the outer face of the rear plate by caulking.

Seventh Aspect

In a seventh aspect, the bracket in the image forming apparatus according to the sixth aspect has a first positioning hole and a second positioning hole. The first positioning hole serves as a main reference and is coupled to another end of one of the multiple shafts. The second positioning hole serves as a sub-reference and is coupled to another end of another of multiple shafts. The second positioning hole is an elongated hole extending toward the first positioning hole.

Eighth Aspect

In an eighth aspect, the bracket in the image forming apparatus according to the sixth aspect or the seventh aspect has a rectangular shape, and the first positioning hole and the second positioning hole are on a diagonal line of the rectangular shape.

Ninth Aspect

In a ninth aspect, the bracket in the image forming apparatus according to the eighth aspect has a third positioning hole and a fourth positioning hole. The third positioning hole serves as another main reference to position the driver. The fourth positioning hole serves as another sub-reference to position the driver. The fourth positioning hole is an elongated hole extending toward the third positioning hole.

Tenth Aspect

In a tenth aspect, the driver in the image forming apparatus according to the ninth aspect includes a first drive shaft, a first projection, and a second projection. The first drive shaft is coupled to the image bearer. The first projection is concentrical with the first drive shaft and fitted into the third positioning hole. The second projection is fitted into the fourth positioning hole.

Eleventh Aspect

In an eleventh aspect, the image forming apparatus according to any one of the first to tenth aspects further includes another driver to drive a conveyance roller to convey a sheet, and said another driver is disposed below the driver.

Twelfth Aspect

In a twelfth aspect, the image forming apparatus according to any one of the first to eleventh aspects further includes a fan duct disposed above the driver.

Thirteenth Aspect

In a thirteenth aspect, the image forming apparatus according to any one of the sixth to twelfth aspects further includes a pipe coupled to the driven unit. The driver is fixed to an outer face of the bracket, and the pipe is on an inner face of the bracket.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The invention claimed is:

1. An image forming apparatus, comprising:

a housing including a pair of plates facing each other, the pair of plates including:

a front plate; and a rear plate facing the front plate and having an opening;

a driven unit including a rotator and a portion covering the rotator, wherein one end of the driven unit projects outside the housing from the opening of the rear plate; and a driver disposed outside the housing and coupled to the one end of the driven unit, the driver configured to drive the rotator and the driver including a body separated from an outer face of the rear plate.

2. The image forming apparatus according to claim 1, wherein the rotator is a photoconductor or a developing roller.

3. The image forming apparatus according to claim 1, wherein the driven unit further includes a fixing device including:
a fixing roller; and
a pressure roller facing the fixing roller.

4. The image forming apparatus according to claim 1, wherein the driven unit further includes a transfer device.

5. An image forming apparatus, comprising:
a housing including a pair of plates facing each other, the pair of plates including:
a front plate; and
a rear plate facing the front plate and having an opening;
a driven unit, supported by the pair of plates, having one end projecting outside the housing from the opening of the rear plate;
a driver disposed outside the housing and coupled to the one end of the driven unit to drive the driven unit, the driver including a body separated from an outer face of the rear plate; and
a positioner fixed to the outer face of the rear plate, wherein
the body of the driver is fixed to the positioner,
the positioner includes:
a bracket; and
multiple shafts fixing the bracket to the outer face of the rear plate, and
each of the multiple shafts has one end fixed to the outer face of the rear plate by caulking.

6. The image forming apparatus according to claim 5, wherein
the bracket has:
a first positioning hole, coupled to another end of one of the multiple shafts, as a main reference; and
a second positioning hole, coupled to another end of another of the multiple shafts, as a sub-reference, and
the second positioning hole is an elongated hole extending toward the first positioning hole.

7. The image forming apparatus according to claim 6, wherein
the bracket has a rectangular shape, and
the first positioning hole and the second positioning hole are on a diagonal line of the rectangular shape.

8. The image forming apparatus according to claim 7, wherein
the bracket further has:
a third positioning hole as another main reference to position the driver; and
a fourth positioning hole as another sub-reference to position the driver, and
the fourth positioning hole is an elongated hole extending toward the third positioning hole.

9. The image forming apparatus according to claim 8, wherein the driver includes:
a first drive shaft coupled to the rotator;
a first projection concentrical with the first drive shaft and fitted into the third positioning hole; and
a second projection fitted into the fourth positioning hole.

10. The image forming apparatus according to claim 1, further comprising:
another driver to drive a conveyance roller to convey a sheet, the another driver disposed below the driver.

11. The image forming apparatus according to claim 1, further comprising:
a fan duct disposed above the driver.

12. The image forming apparatus according to claim 5, further comprising:
a pipe coupled to the driven unit, wherein
the driver is fixed to an outer face of the bracket, and the pipe is on an inner face of the bracket.

13. The image forming apparatus according to claim 5, wherein the rotator is a photoconductor or a developing roller.

* * * * *